Aug. 23, 1966    J. A. HARPER    3,267,753
LANDING GEAR CONTROL
Filed Aug. 2, 1963    5 Sheets-Sheet 1

INVENTOR:
Jay A. Harper
By Smyth, Roston & Pavitt
Attorneys

Aug. 23, 1966  J. A. HARPER  3,267,753
LANDING GEAR CONTROL
Filed Aug. 2, 1963  5 Sheets-Sheet 3

INVENTOR
Jay A. Harper
By Smyth, Roston & Pavitt
Attorneys

United States Patent Office
3,267,753
Patented August 23, 1966

3,267,753
LANDING GEAR CONTROL
Jay A. Harper, Gardena, Calif., assignor to Acme
Machine Works, Inc., Hawthorne, Calif., a corporation of California
Filed Aug. 2, 1963, Ser. No. 299,638
14 Claims. (Cl. 74—109)

This invention relates to a landing gear control system for an aircraft wherein the landing gear is raised and lowered in response to the actuation of switch means, the invention relating specifically to a mechanical unit adapted for installation in the cockpit of an aircraft, which unit incorporates a mechanism for actuating the switch means of the landing gear system.

Such a manually operable mechanism typically includes a control lever with a handle for manual operation between a lower position for lowering the landing gear and an upper position for raising the landing gear. Suitable indicator lamps indicate whether the landing gear is down or up.

The manually operable mechanism typically further includes a safety lock or "down" lock to prevent inadvertent raising of the control lever as long as the lowered landing gear bears the weight of the aircraft. To provide a fail-safe arrangement, the safety lock is biased by a spring to its locking position and is retracted by a solenoid in opposition to the spring when the aircraft becomes airborne. Since there is always the possibility of functional failure of the solenoid, the manually operable mechanism further includes manual override means to retract the safety lock independently of the solenoid.

The present invention is directed to certain needs for improvement over prior art mechanical control units of the character described.

One need is for a construction that is immune to corrosion and at the same time is rugged, with adequate strength to withstand all the forces to which it may be subjected. The invention meets this need by a mechanical design of high inherent strength which lends itself to fabrication from stainless steel. In this regard, a feature of the invention is the manner in which the manual control lever of the unit is journaled and is connected to an interconnect arm of the unit, which arm is adapted for connection to a similar arm of a second similar unit for interlocking the two units. As will be explained, the invention provides a novel subassembly in which the control lever and the interconnect arm are keyed to a common shaft by means of longitudinal serrations on the shaft, and the whole assembly is clamped or compressed axially to interlock the parts of the assembly.

Another need to which the invention is directed relates to the manual override for retracting the safety lock in the event of functional failure of the safety lock solenoid. The invention employs a simple pushbutton for retracting the safety lock, and the linear movement of the pushbutton is converted into rotational movement of a rotary member, and a radial arm of the rotary member engages the safety lock for retraction thereof. The radial arm extends through a slot in the safety lock in such manner as to avoid interfering with normal retraction of the safety lock by the associated solenoid.

Another avenue of improvement is in the manner in which the mechanical unit actuates the landing gear switches. It is desirable that the landing gear control lever be manipulated in a decisive manner, and it is further desirable that the response of the landing gear to the control lever be confined to the final approach of the lever to its two limit positions. Thus, when the lever is lowered from its upper limit position to its lower limit position, the response of the landing gear should be delayed until the end of the movement as the lever approaches its lower limit position. In like manner, the lowering of the landing gear should not be initiated during the downward swing of the control lever until the control lever approaches its lower limit position.

The present invention is conducive to decisive and positive manipulation of the control lever by virtue of a detent arrangement which not only retains the lever at whichever limit position to which it may be placed, but also provides a yielding cam action to urge the lever towards whichever limit position it may approach. To move the control lever from one limit position to another, the detent force must first be overcome to initiate the movement, and then after the lever passes the midpoint in its range of movement, cam action on the part of the detent means becomes effective in the opposite direction to boost the lever movement. Thus, inadvertent operation of the landing gear is initially discouraged by the detent arrangement, and the inherent delay in the response of the switches to the movement of the control lever is a further safety factor.

Another feature of the invention is in the mechanism which operatively relates the control lever to the landing gear switches with delayed operation of the switches. The switches are actuated by a linear cam means, and the control lever is operatively connected to the cam means by a rack-and-pinion mechanism. To delay the actuation of the switches, lost motion is introduced in two ways. First, the cam means is formed with extended dwells which result in lost motion. Second, a lost-motion connection is provided between the control lever and the cam means. These two provisions are additive to delay the operation of the landing gear switches until the control lever approaches a limit position in its two directions of operation.

The features and advantages of the invention may be understood by reference to the following detailed description and the accompanying drawings.

In the drawings, which are to be regarded as merely illustrative.

General arrangement

Figure 1:
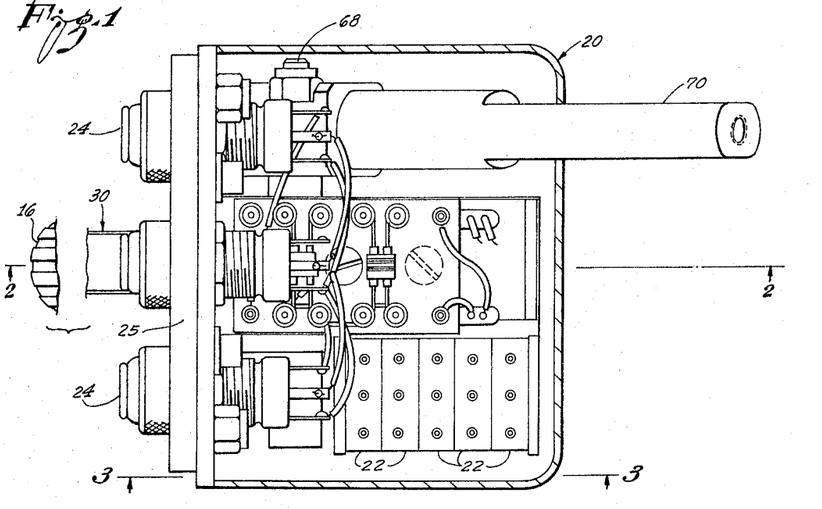
FIG. 1 is a top plan view of the presently preferred embodiment of the landing gear control unit with the top wall of the housing broken away to reveal the internal structure.

In the selected embodiment of the mechanical control unit shown in the drawings, the unit is encased in a suitable housing 20 that is adapted for mounting in the cockpit of an aircraft. The unit incorporates a bank of five switches 22, shown in FIGS. 1 and 3, and the usual plurality of indicators or signal lamps, including signal lamps 24 on a front panel 25 of the housing and concealed warning lamps in a handle 26 on a landing gear control lever 30, a portion of the handle being translucent for illumination by the concealed warning lamps. Among the signal lamps 24 on the front panel of the unit are three lamps which indicate when the nose landing gear, the right landing gear, and the left landing gear, respectively, are lowered. The control lever 30 is moved to its lower position to lower the landing gear and is moved to its upper position to raise the landing gear.

The control unit is adapted for connecting the wiring of the landing gear system with the bank of switches 22 and with the various signal lamps of the unit. For this purpose, the unit is equipped with numerous wires 32, some of which are connected to the indicator lamps and some of which are connected to the bank of switches. The wires for connecting the unit with the landing gear wiring are formed into a bundle 34 and extend into a short conduit that is anchored in the back wall of the housing.

Figures 5, 6:
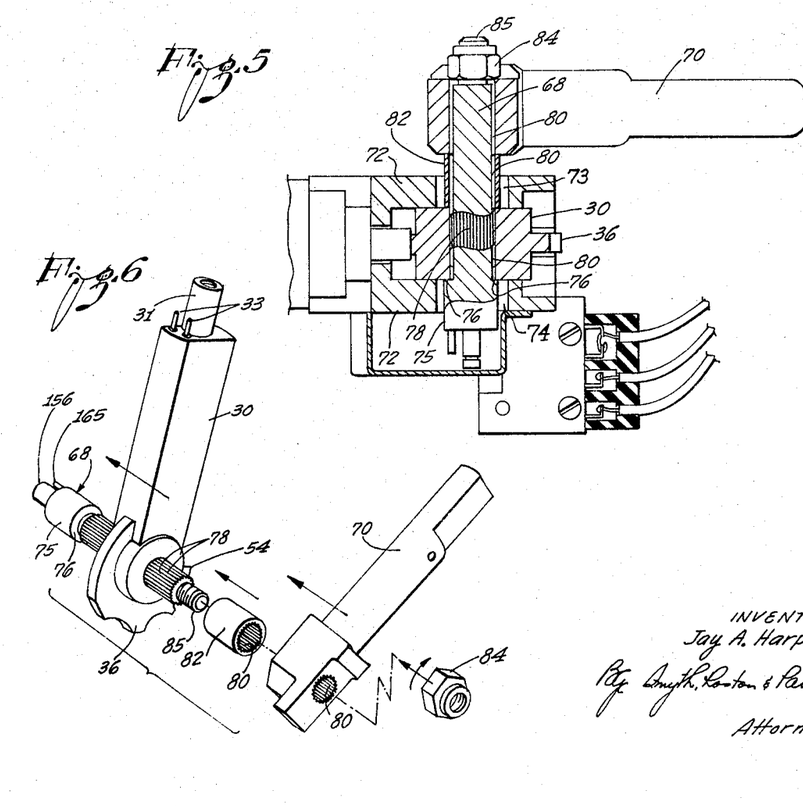
FIG. 5 is a view partly in section and partly in elevation of a subassembly employed for mounting the control lever and for mechanically connecting the control lever with an interconnect arm that is employed for interlocking two of the control units in a dual control arrangement.
FIG. 6 is an exploded perspective view of components of the subassembly shown in FIG. 5.

The knob or handle 26 on the control lever 30 (FIG. 2) is hollow and houses a pair of warning lamps 27 which illuminate a pair of diametrically opposite red filters 28. A feature of the invention is that the knob 26 is, in effect, a conveniently replaceable lamp unit which is removable from the control lever at a joint 29. As shown in FIG. 6, the lever 30 has an internally threaded tubular portion 31 which mates with the knob 26, and the lever is further provided with a pair of fixed electrical connector pins 33 that plug into the knob to complete the lamp circuit. A suitable accessible screw 37 (FIG. 2) inside the knob 26 threads into the tubular portion 31 of the lever 30 to retain the knob on the lever. The knob 26 may be quickly removed for replacement simply by loosening the screw 37.

Figure 2:
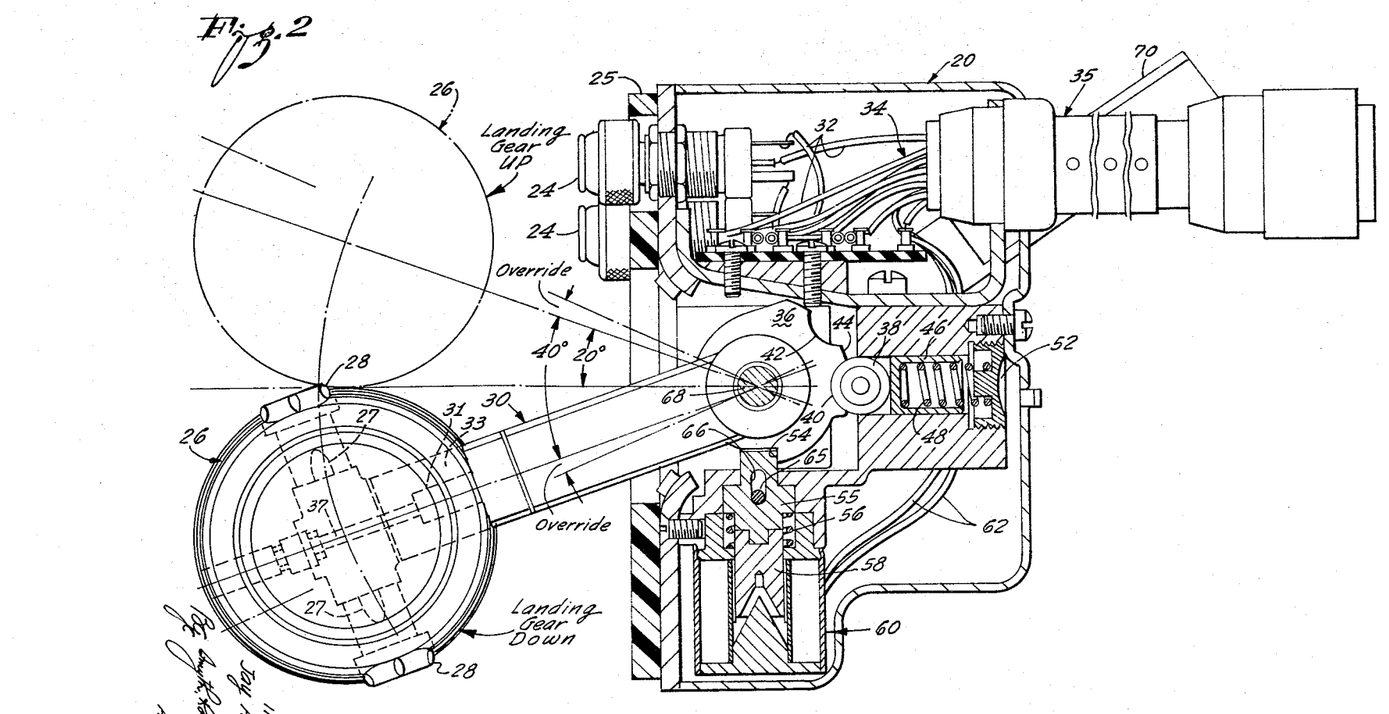
FIG. 2 is a longitudinal vertical section taken as indicated by the line 2—2 of FIG. 1 showing the control lever in its "down" position.

As heretofore mentioned, suitable detent means is provided to yieldingly maintain the control lever 30 in its two limit positions and to aid the movement of the control lever as it approaches each of its two opposite limit positions. For this purpose, the pivoted end of the control lever 30 is provided with a radial web 36 to cooperate with a spring pressed detent member in the form of a roller 38. The radial web has an arcuate detent recess 40 which seats the roller 38 in the "down" position of the control lever 30, as shown in FIG. 2, and has a second similar upper detent recess 42 which seats the detent member when the control lever is in its "up" position. As may be seen in FIG. 1, the two recesses 40 and 42 are separated by a short peripheral portion 44 of the radial web 36 which is under pressure from the detent roller 38 when the control lever is at the midpoint between its two opposite limit positions.

The detent roller 38, which is journaled on a pin 45, is carried by a hollow plunger 46 which is continuously urged towards the web 36 by a coil spring 48. The coil spring 48 backs against a screw-threaded adjustment member 50 which has a diametrical slot 52 on its outer end. The slot 52 is accessible to receive a screw driver for rotation of the adjustment member 50 to vary the pressure exerted by the spring 48.

When the landing gear is down and the weight of the aircraft is carried by the landing gear, a suitable safety lock or "down" lock immobilizes the control lever 30 at its "down" position, as heretofore stated. For this purpose, the radial web 36 is formed with a locking shoulder 54, and a lock member 55 is urged upward into engagement with the locking shoulder by means of a coil spring 56. By virtue of this safety lock, the landing gear cannot be inadvertently raised when the weight of the aircraft is on the landing gear. When the aircraft becomes airborne, the lock member 55 is retracted automatically. For this purpose, the lock member 55 is united with a movable core 58 of a solenoid 60, which solenoid is connected to the landing gear circuitry by a pair of wires 62.

Figure 3:
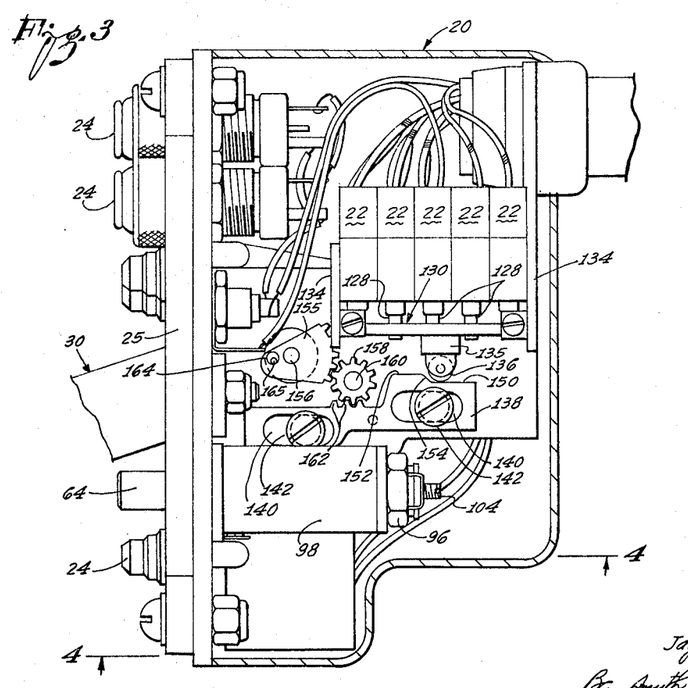
FIG. 3 is a side elevation of the interior of the unit as seen along the line 3—3 of FIG. 1.
Figure 4:
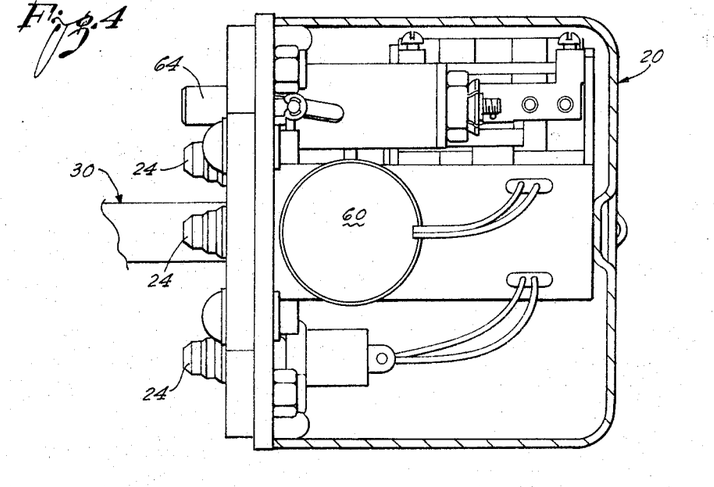
FIG. 4 is a bottom view of the interior of the unit as seen along the angular line 4—4 of FIG. 3.

Because of the possibility of functional failure of the solenoid 60, the control unit provides an override button 64, shown in FIGS. 3 and 4, which may be depressed for manual retraction of the lock member 55 in opposition to the force exerted by the coil spring 56. When the override button 64 is manually depressed, it causes a radial pin 65 (FIG. 2) inside the housing to swing in a direction to retract the lock member. As may be seen in FIG. 2, the radial pin 65 extends through a longitudinal slot 66 in the lock member 55, the slot being dimensioned to keep the radial finger from interfering with independent retraction of the lock member by the solenoid 60.

As will be explained later, the control lever 30 is operatively connected to the bank of switches 22 by a suitable lost-motion mechanism which delays actuation of the switches throughout the major portion of the swinging movement of the lever. Thus, when the control lever 20 is swung upward from its lower limit position shown in FIG. 2, the switches 22 are not actuated until the lever enters the last half of its range of movement and approaches its upper limit position. In like manner, when the control lever 30 is swung downward from its upper limit position, it enters the lower half of its lower range of movement and approaches its lower limit position before the switches 22 are released for lowering of the landing gear.

The previously described detent roller 38 in cooperation with the two detent recesses resists intial movement of the control lever 30 out of either of its two limit positions and continues this resistance throughout a few degrees of movement of the control lever; but when the control lever moves past center and enters the second half of its range of movement, the detent means exerts force to boost the movement of the control lever, the boosting action being a cam action of the detent roller 38 against a sloping wall of a detent recess 40 or 42. Inadvertent operation of the landing gear is discouraged by the fact that a determined effort is required to disengage the control lever from the detent roller 38 at a limit position of the control lever, and inadvertent operation of the landing gear is further discouraged by the delay in the response of the switches 22 to the swinging movement of the control lever.

Handle and lever assembly (FIGS. 2, 5, and 6)

Since the control unit is intended primarily for use on large aircraft where dual controls are mandatory, the unit includes means for interlocking the described unit with a second similar unit. For this purpose, the control lever 30 is mounted on a short shaft 68 (FIG. 2), and a driven member in the form of a rearwardly extending interconnect arm 70 (FIGS. 1 and 2) is keyed to the same shaft, it being contemplated that the two rearwardly extending interconnect arms 70 of two control units will be mechanically linked together for effectively interlocking the two units.

It is apparent that the force required to shift the control lever 30 of two interconnected units from one of its limit positions to the other limit position must not only overcome all the frictional resistance that is inherent in the two units, but must also overcome the resistances of the two detent springs 48 in the two units. Since reliability is of primary importance, it is highly essential that relatively great strength be built into the connection of the control lever 30 with the shaft 38 and into the connection of the interconnect arm 70 with the same shaft. A feature of the invention is the employment for this purpose of a subassembly, shown in FIGS. 5 and 6, comprising the control lever 30, the interconnect arm 70, and the shaft 68 on which the two are mounted.

As shown in FIG. 5, the control arm 30 is confined between two spaced webs 72 inside the housing 20, and the shaft 68 on which the control lever is mounted is journaled in two sleeve bearings 73 and 74 in the two webs respectively. One end of the shaft 68 is formed with an enlargement 75 which provides a radial shoulder 76, the enlargement being journaled in the bearing 74 with the shoulder 76 in abutment against one side of the control lever 30. Beginning at the radial shoulder 76, the shaft 68 is longitudinally serrated to form a large number of small longitudinal splines 78. The shaft-receiving aperture through the base of the control lever 30 is formed with complementary splines 80 for positive engagement with the shaft splines 78, and in like manner the shaft-receiving aperture of the arm 70 is also formed with complementary splines 80 for positive engagement with the shaft splines. For the purpose of journaling the shaft 68 in the bearing 73, a short sleeve 82 is mounted on the shaft, and here again the short sleeve may be formed with internal complementary splines 80 for positive engagement with the shaft splines 78.

This subassembly is completed by a suitable nut 84 which engages threads on a reduced end portion 85 of the shaft 68. As may be readily understood by reference to FIG. 5, tightening the nut places the assembly under longitudinal stress with the shaft 68 in tension. The shaft is anchored against axial movement because the control lever 30 is confined between the two webs 72 and because the control lever is locked to the shaft. Thus, the control lever 30 is clamped between the radial shoulder 76 of the shaft and the end of the sleeve 82, the sleeve being pressed endwise against the control lever by the crowding effect of the nut 84 on the arm 70.

It is apparent that the described subassembly is not only of dependable, rugged construction, but is also of relatively simple construction that lends itself to rapid assembly.

*Down lock and manual override (FIGS. 2, 4, and 9–12)*

As heretofore stated, manual depression of the override button 64 swings the radial pin 65 downward, as viewed in FIG. 2, to retract the lock member 55 out of engagement with the locking shoulder 54. For this purpose, suitable means is provided to convert the linear motion of the override button 64 into rotary motion for the swinging action of the radial pin 65. The construction of the mechanism employed for this purpose may be understood by referring to FIGS. 9–12.

The override push button 64 is slidingly mounted in a fixed guide sleeve 86. The guide sleeve 86 is fixedly mounted in an aperture 88 in the front panel 25 of the unit and for this purpose is formed with a radial flange 90 that abuts the inner face of the panel. The forward end of the guide sleeve is screw-threaded to receive a nut 92, which is tightened against the panel to immobilize the guide sleeve.

Figures 9, 10, 11:
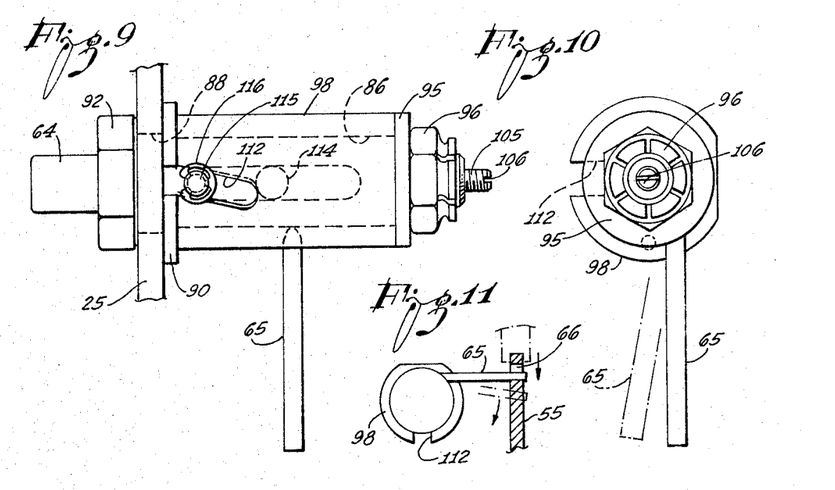
FIG. 9 is a plan view of a subassembly which serves as the override for releasing the safety lock independently of the safety lock solenoid.
FIG. 10 is an end elevation of the structure shown in FIG. 9.
FIG. 11 is a somewhat diagrammatic view showing how a radial pin of the subassembly engages a longitudinal slot in the safety lock member.

The guide sleeve 86 has a reduced screw-threaded inner end 94 to receive a washer 95 and a nut 96. As shown in FIG. 9, the washer 95 cooperates with the flange 90 to confine a rotary member in the form of a sleeve 98 that rotatably embraces the guide sleeve 86. The previously mentioned radial pin 65 is mounted on the rotary sleeve 98 for swinging movement by the sleeve.

Figure 12:
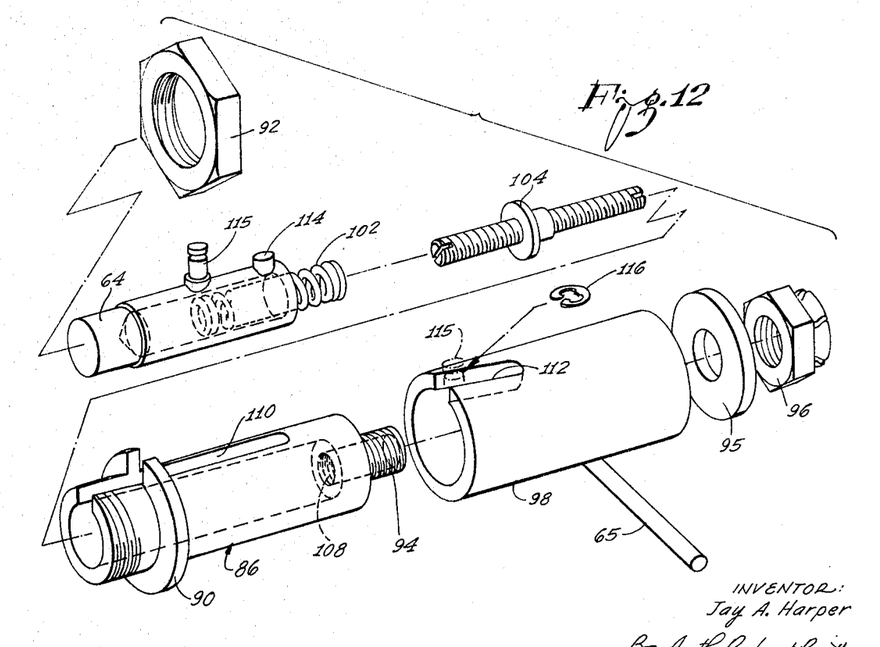
FIG. 12 is an exploded perspective view of the subassembly shown in FIG. 9.

The override button 64 is of hollow construction, as indicated in FIG. 12, to receive a suitable coil spring 102 for urging the override button towards its normal forward position. The coil spring 102 backs against a collar 104 on an adjustment screw 105 which has an exposed end formed with a diametrical slot 106 for adjustment by a screw driver. The adjustment screw 105 is mounted in the reduced end portion 94 of the fixed guide sleeve 86 in engagement with an internal screw thread 108 (FIG. 12) of the reduced end portion.

It is apparent that the pressure exerted by the spring 102 to maintain the override button 64 at its normal forward position may be varied by turning the adjustment screw 105.

For the purpose of converting the linear movement of the override button 64 into rotation of the rotary sleeve 98, the fixed guide sleeve 86 including the flange 90 is provided with a longitudinal linear guide slot 110, and the rotary sleeve 98 is formed with an inclined or helical slot 112. The override button 64 has a short radial stud 114 in sliding engagement with the linear slot 110 to prevent rotation of the override button throughout its range of reciprocation. The override button is further provided with a second longer radial stud 115, which extends through both the linear slot 110 of the guide sleeve 86 and the helical slot 112 of the rotary sleeve 98, the outer end of the longer stud being provided with a suitable snap ring 116. Since the engagement of the override button 64 with the fixed longitudinal guide slot 110 confines the longer stud 115 to a linear path, the longer stud, by virtue of its engagement with the helical slot 112, causes the required rotation of the rotary sleeve 98 for retraction of the lock member 55.

*Lost-motion mechanism to operate switches (FIGS. 3, 7, and 8)*

The five switches 22 that control the landing gear are snap-acting switches which are closed to raise the landing gear. The five switches have operating plungers 128 contiguous to a pressure plate, generally designated 130, that is adapted for vertical movement. When the pressure plate 130 is elevated from the lower position shown in FIG. 3, it exerts pressure to close all five of the switches 22 substantially simultaneously.

Mounted on the underside of the pressure plate 130 is a suitable bracket 135 in which is journaled a follower 136 in the form of a roller for cooperation with a reciprocative cam member 138. The cam member 138 is formed with a pair of longitudinal slots 140 by means of which it is slidingly mounted on a pair of headed studs 142 for linear reciprocation.

Figure 8:
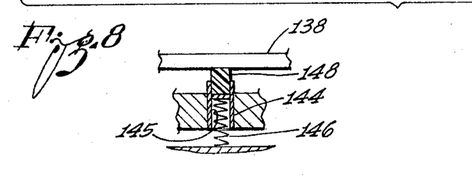
FIG. 8 is a fragmentary sectional view showing how a frictional retarding means cooperates with one of the movable members in FIG. 7.

Suitable means is provided to frictionally resist longitudinal movement of the cam member 138, thereby to maintain the cam member in whatever longitudinal position it may be placed by an operating force. As shown in FIG. 8, such a friction means may comprise a hollow plunger 144 slidingly mounted in a bore 145 in the fixed structure of the unit. The plunger is urged outward by a spring 146 and is provided with a friction head 148 having a high coefficient of friction with respect to the surface of the cam member.

The cam member 138 has a flat lower dwell 150 corresponding to the lowered state of the landing gear and a flat upper dwell 152 corresponding to the elevated state of the landing gear, the two flat dwells being interconnected by an inclined shoulder 154.

As shown in FIG. 3, the cam member 138 is reciprocated by rack and pinion means in response to raising and lowering of the control lever 30. In the construction shown, a gear segment 155 is mounted on a reduced end portion 156 of the shaft 68 for operation by the control lever 30. The gear segment 155 meshes with an idler pinion 158 on a spindle 160, and the pinion, in turn, meshes with rack teeth 162 on the cam member 138. The gear segment 155 has a lost-motion connection with the shaft 68 and for this purpose is freely rotatable on the axial extension 156 of the shaft. The lost-motion connection between the shaft and the gear segment comprises a small aperture 164 in the gear segment and a cooperating eccentric pin 165 on the shaft, the diameter of the pin being substantially less than the diameter of the pin. In effect, the small aperture 164 is equivalent to a pair of spaced confronting surfaces or abutments with which the pin 165 cooperates alternately.

Figure 7:
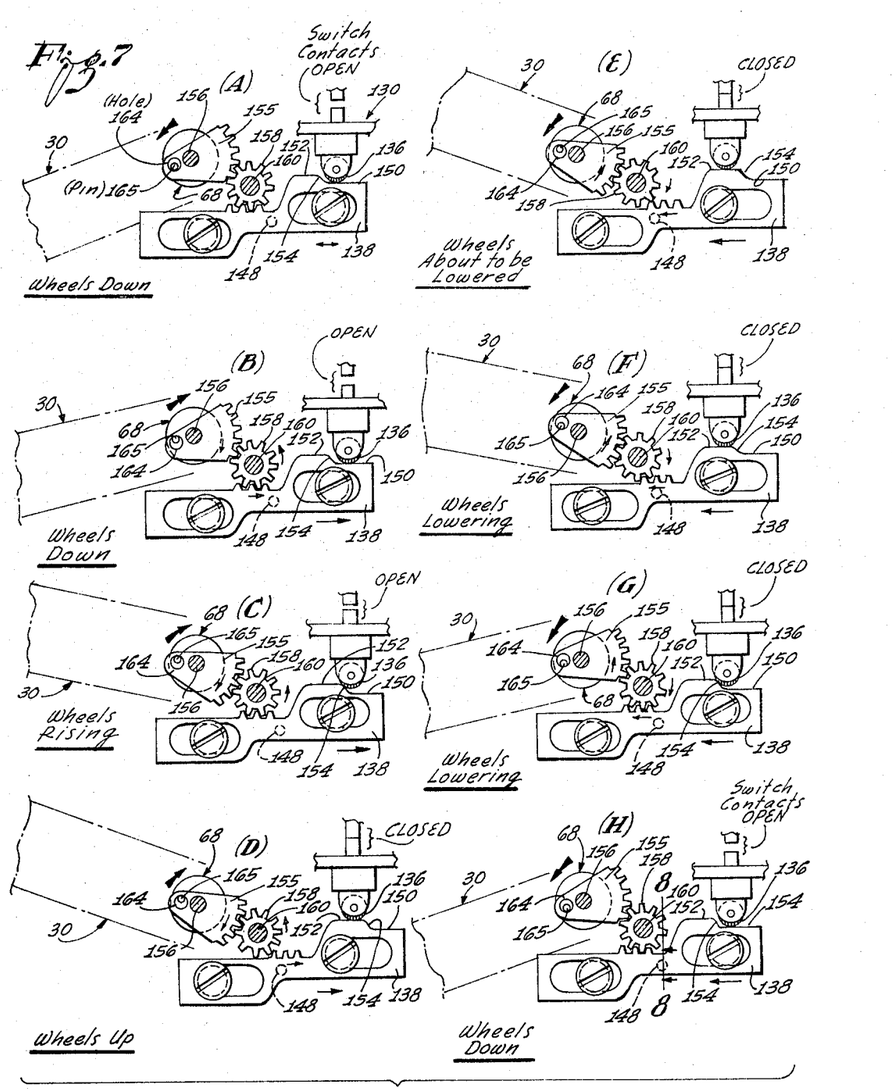
FIG. 7 is a somewhat diagrammatic view illustrating various stages in the action of a lost-motion mechanism that operatively connects the control lever with the switches of the landing gear system.

The manner in which the lost-motion connecting means functions for its purpose may be understood by referring to FIG. 7.

FIG. 7A shows the normal state of the mechanism when the control lever 30 is in its "down" position. The carriage 130 is in its "down" position with the follower 136 on the lower dwell 150 of the cam, the follower being spaced substantially from the inclined cam shoulder 154. The pin 165 abuts the lower periphery of the aperture 164 in the gear segment 155. The initial upward movement of the control lever 30 takes up the lost motion between the shaft 68 and the gear segment 155, the initial rotation of the shaft carrying the eccentric pin 165 across the aperture 164 to the position shown in FIG. 7B, where the eccentric pin abuts the upper periphery of the aperture. The pressure of the friction head 148 against the cam member 138 keeps the cam member immobilized, the braking effect of the pressure of the friction head against the cam member being sufficient to overcome any tendency for the gear segment 155 to be rotated by its frictional contact with the shaft 68.

The next increment of upward movement of the control lever 30 causes the gear segment 155 to rotate the pinion 158, and the pinion, in turn, shifts the cam member 138 rightward to the position shown in FIG. 7C, where the follower 136 is on the inclined shoulder 154 of the cam but is not quite high enough on the shoulder to cause operation of the bank of switches 22. Thus, in the second increment of the upward movement of the control lever, further lost motion is introduced by the relative movement between the follower 136 and the lower dwell 150 of the cam member.

Further upward movement of the control lever 30 to its upper limit position, represented by FIG. 7D, causes the cam member 138 to complete its rightward movement to the position shown. When this final upward movement of the control lever is initiated, the follower 136 is forced to the crest of the inclined shoulder 154 to cause operation of all of the switches 22, and the switches remain open as lost motion again occurs as the follower traverses the flat upper dwell 152 of the cam member.

FIG. 7E, which is a duplicate of FIG. 7D, shows the state of the mechanism when the landing gear is up. It will be noted that the eccentric pin 165 is at the upper periphery of the aperture 164. The initial downward movement of the control lever from its upper limit position takes up lost motion by shifting the eccentric pin 165 downward across the aperture 164 to the lower periphery of the aperture, as shown in FIG. 7F, without disturbing the rest of the mechanism.

Further downward movement of the control lever 30 takes up further lost motion by shifting the cam member 138 leftward to cause the follower 136 to traverse the flat upper dwell 152 of the cam member to the crest of the inclined shoulder 154, as shown in FIG. 7G, without causing the switches to open. The final downward movement of the control lever completes the leftward movement of the cam member 138 to the position shown in FIG. 7H, which is a duplicate of FIG. 7A. At the initiation of this final downward movement of the control lever, the follower 136 causes all of the switches to open, the switches remaining open during the final lost motion as the follower traverses the flat lower dwell 150.

It is contemplated that the total lost motion provided by the range of movement of the eccentric pin 165 in the aperture 164 and additionally provided by the extent of relative movement between the follower 136 and a flat dwell 150 or 152 of the cam member 136 will extend well over more than one-half of the range of swinging movement of the control lever 30. By virtue of this fact, the switches do not respond to the control lever until the control lever moves past the midpoint of its range and enters the final stage of its movement, where it is boosted by the cam action of the detent roller 38. Thus, the landing gear is actually operated only after the detent roller 38 climbs over the peripheral peak 44 of the web 36 and the final snap action of the control lever to its limit position is well started.

A feature of the invention is the compactness of the unit and the manner in which the extensive lost motion is accomplished in a small space. If all the lost motion were provided by the cam member 138, it would be necessary to increase the length of both of the two dwells 150 and 152; and it would be necessary not only to increase the range of reciprocation of the cam member, but also to increase the arcuate extent of the gear segment 155. All of these added dimensions are avoided by providing the lost-motion connection between the control lever and the gear segment in the form of the aperture 164 and the cooperating eccentric pin 165.

My description in specific detail of the initial embodiment of the invention will suggest various changes, substitutions, and other departures from my disclosure within the spirit and scope of the appended claims.

I claim:

1. In a manually operable mechanism of a control system for the landing gear of an aircraft wherein a manually operable control member for raising and lowering the landing gear is automatically engaged by a locking means to prevent raising the landing gear while the weight of the aircraft is on the landing gear, manual means to release said locking means, comprising:
   linear guide means;
   a rotary member having a helical groove, said rotary member being operatively connected to said locking means;
   manually operable override means in engagement with both said guide means and said groove, said override means being movable from a normal retracted position along the guide means to rotate the rotary means to retract the locking means.

2. In a manually operable mechanism of a control system for the landing gear of an aircraft wherein a manually operable control member for raising and lowering the landing gear is automatically engaged by a locking means to prevent raising the landing gear while the weight of the aircraft is on the landing gear, manual means to release said locking means, comprising:
   rotary means having a helical groove;
   override means manually movable linearly from a retracted position to an advanced position, said override means being in engagement with said groove to rotate the rotary means;
   means extending from said rotary means to said locking means to retract the locking means; and
   spring means biasing said override means towards its retracted position.

3. In a system for controlling the landing gear of an aircraft wherein the landing gear operates in response to a plurality of switches, a manually operable control mechanism, comprising:
   a control lever movable from a lower position to lower the landing gear to an upper position to raise the landing gear;
   a first member movable to operate said plurality of switches;
   a second member;
   a cam on one of said two members;
   a follower on the other of the two members to cooperate with the cam to actuate the first member for operation of the switches,
   said cam having a first dwell to make the follower nonresponsive to an early portion of the downward movement of the lever and a second dwell to make the follower nonresponsive to an early portion of the upward movement of the lever;
   a connection between the lever and the second member for movement of the second member by the lever, said connection incorporating lost-motion means to make the follower nonresponsive to another portion of the downward movement of the lever and to make the follower nonresponsive to another portion of the upward movement of the lever; and means to frictionally oppose movement of the cam thereby to prevent movement of the cam while said connection is operating with lost motion.

4. In a system for controlling the landing gear of an aircraft wherein the landing gear operates in response to a plurality of switches, a manually operable control mechanism, comprising:

a control lever movable between a lower position to operate the switches in one respect to lower the landing gear and an upper position to operate the switches in an opposite respect to raise the landing gear;

fixed structure in the region of the pivot axis of the lever;

a pair of detent recesses on one of said lever and said fixed structure;

a detent member movably mounted on the other of said lever and fixed structure to cooperate with said recesses for detent action on the lever, said detent member seating in said two recesses to limit the upper and lower positions respectively of the lever; spring means urging the detent member to seat in the recess to yieldingly retain the lever at its upper and lower positions respectively; and a lost-motion mechanism operatively connecting said lever to said switches to delay operation of the switches in the two opposite respects until the lever approaches its two opposite limit positions respectively.

5. A combination as set forth in claim 4, in which each of said recesses has sloping shoulders and each recess corresponds to a major portion of one-half of the range of movement of the lever, whereby the detent member cooperates with the lever with cam action to oppose the movement of the lever in the first half of its movement from one limit position to the other and to boost the movement of the lever in the last half of its movement.

6. A combination as set forth in claim 5, in which said lost-motion mechanism is constructed and arranged to delay the operation of the switches in the course of the movement of the lever from one limit position to the other limit position until the boosting action occurs as the lever approaches said other limit position.

7. In a system for controlling the landing gear of an aircraft wherein the landing gear operates in response to a plurality of switches, a manually operable control mechanism, comprising:

a control lever movable from a lower position to lower the landing gear to an upper position to raise the landing gear;

means to yieldingly resist the movement of the lever away from either of its two positions and to boost the movement of the lever as it approaches either of its two positions;

cam means to operate said switches; and means including a rack and pinion operatively connecting said lever with said cam means for actuation thereof.

8. A combination as set forth in claim 7, in which said means operatively connecting the lever with the cam means includes a lost-motion connection to delay the response of the switches to the lever.

9. In a system for controlling the landing gear of an aircraft wherein the landing gear operates in response to a plurality of switches, a manually operable control mechanism, comprising:

a control lever movable from a lower position to lower the landing gear to an upper position to raise the landing gear;

fixed structure in the region of the pivot axis of the lever;

a pair of detent recesses on one of said lever and said fixed structure;

a detent member on the other of said lever and fixed structure to cooperate with said recesses for detent action on the lever, said detent member seating in said two recesses at the upper and lower positions respectively of the lever to yieldingly retain the lever at its upper and lower positions respectively;

cam means to operate said switches, said cam means having upper and lower dwells to provide lost motion during which the switches are nonresponsive to the cam means;

rack and pinion means to operate said cam means; and a lost-motion connection operatively connecting said lever with said rack and pinion to delay the response of the cam means to the operation of the lever.

10. A combination as set forth in claim 9, in which each of said recesses has sloping shoulders and each recess corresponds to a substantial portion of one-half of the range of movement of the lever, whereby the detent member cooperates with the lever with cam action to oppose the movement of the lever in the first half of its movement from one limit position to the other and to boost the movement of the lever in the last half of its movement.

11. In a system for controlling the landing gear of an aircraft wherein the landing gear operates in response to a plurality of switches, the combination of:

a control lever movable from a lower position to lower the landing gear to an upper position to raise the landing gear;

a first member movable to operate said plurality of switches;

a second member responsive to said lever for movement thereby;

a cam on one of said two members;

a follower on the other of the two members to cooperate with the cam to actuate the first member for operation of the switches, said cam having a first dwell to make the follower nonresponsive to an early portion of the downward movement of the lever and a second dwell to make the follower nonresponsive to an early portion of the upward movement of the lever;

locking means to prevent movement of said control lever for raising the landing gear while the weight of the aircraft is on the landing gear;

linear guide means;

a rotary member having a helical groove, said rotary member being operatively connected to said locking means; and manually operable override means in engagement with both said guide means and said groove, said override means being movable from a normal retracted position along the guide means to rotate the rotary means to retract the locking means, said locking means being free to retract independently of the rotary means.

12. A combination as set forth in claim 4 in which the lost-motion mechanism includes two cooperating members, one of the two members being movable by the lever, the switches being responsive to the other of the two members, one of said two members having two spaced confronting surfaces, a portion of the other member being positioned between the two confronting surfaces for abutment with the two confronting surfaces alternately to provide at least a portion of the lost motion to delay the operation of the switches.

13. A combination as set forth in claim 4 in which the lost-motion mechanism includes a cam with a dwell to provide at least a portion of the lost motion to delay the operation of the switches.

14. A combination as set forth in claim 4 in which the lost-motion mechanism includes two cooperating members, one of the two members being movable by the lever, the switches being responsive to the other of the two members, one of said two members having two spaced confronting surfaces, a portion of the other member being positioned between the two confronting surfaces for abutment with the two confronting surfaces alternately to provide a portion of the lost motion to delay the operation of the switches; and
  in which the lost-motion mechanism further includes a cam with a dwell to provide another portion of the lost motion to delay the operation of the switches.

References Cited by the Examiner

UNITED STATES PATENTS

| | | | |
|---|---|---|---|
| 483,800 | 10/1892 | Bellows | 74—104 X |
| 1,128,129 | 2/1915 | Gilmore | 74—523 |
| 1,393,111 | 10/1921 | Getchell | 74—97 X |
| 1,799,229 | 4/1931 | Hanna | 74—110 |
| 2,045,045 | 6/1936 | Moore | 74—104 X |
| 2,331,108 | 10/1943 | De Ganahl | 244—102 X |
| 2,390,365 | 12/1945 | Goff | 74—97 X |
| 2,460,695 | 2/1949 | Hennessy | 74—96 |
| 2,525,846 | 10/1950 | Wilson | 74—532 |
| 2,558,103 | 6/1951 | Ruckestahl et al. | 74—523 |
| 2,604,553 | 7/1952 | Babcock | 74—96 X |
| 2,661,765 | 12/1953 | Troy | 74—107 X |
| 2,675,435 | 4/1954 | Framhein | 74—110 X |
| 2,747,419 | 5/1956 | Arvidson | 74—107 |
| 2,775,686 | 12/1956 | Bulkin | 240—2 |
| 2,793,541 | 5/1957 | Borcherdt | 74—534 X |
| 2,928,629 | 3/1960 | Soderberg | 74—534 X |
| 2,945,652 | 7/1960 | Dupree | 244—102 |
| 3,049,024 | 8/1962 | Daly | 74—534 |

FOREIGN PATENTS 670,994  12/1929  France.

MILTON KAUFMAN, *Primary Examiner.*
BROUGHTON G. DURHAM, *Examiner.*
D. H. THIEL, *Assistant Examiner.*